United States Patent [19]

Lupkas

[11] 4,117,832
[45] Oct. 3, 1978

[54] SOLAR ENERGY COLLECTOR

[76] Inventor: Raymond R. Lupkas, 54 Mt. Pleasant Dr., Trumbull, Conn. 06611

[21] Appl. No.: 849,237

[22] Filed: Nov. 7, 1977

[51] Int. Cl.² ............................................. F24J 3/02
[52] U.S. Cl. .................................. 126/271; 165/185; 165/DIG. 4; 126/270
[58] Field of Search ............... 237/1 A; 126/270, 271; 165/DIG. 4, 185

[56] References Cited

U.S. PATENT DOCUMENTS

| | | | |
|---|---|---|---|
| 2,594,232 | 4/1952 | Stockstill | 126/271 |
| 3,149,666 | 9/1964 | Coe | 165/122 |
| 3,220,471 | 11/1965 | Coe | 165/185 |
| 3,264,494 | 7/1966 | Smith, Jr. | 165/171 |
| 3,305,011 | 2/1967 | Smith, Jr. | 165/171 |
| 3,982,527 | 9/1976 | Cheng et al. | 126/270 |
| 4,003,364 | 1/1977 | Balkus, Jr. | 126/271 |
| 4,007,729 | 2/1977 | Chao et al. | 126/271 |
| 4,011,855 | 3/1977 | Eshelman | 126/271 |

FOREIGN PATENT DOCUMENTS 2,522,154  11/1976  Fed. Rep. of Germany ........... 126/271
2,643,431   4/1977  Fed. Rep. of Germany ........... 126/271

*Primary Examiner*—Henry C. Yuen
*Attorney, Agent, or Firm*—Robert E. Meyer

[57] ABSTRACT

A solar energy collector has members exposed to the sun to collect heat from the sun's rays and has at least one fluid carrying conduit in heat exchange relationship with the members. Heat energy collected by the members is transferred by conduction to the fluid in the conduit for utilization. The collecting members most remote from the fluid carrying conduit are constructed with a thinner cross sectional thickness than the portion closest to the fluid carrying conduit so as to improve the heat transfer through the member from the surface to the fluid in the conduit.

3 Claims, 2 Drawing Figures

SOLAR ENERGY COLLECTOR

BACKGROUND OF THE INVENTION

This invention relates to devices for collecting solar energy on members exposed to the sun's rays and transferring the heat collected thereby to a circulating fluid for utilization in any desired manner. The most well known of these devices are called flat plate collectors since the members exposed to the sun are simple flat plates. Another collector device, disclosed in my copending application entitled Solar Energy Collector Device filed Jan. 21, 1977, Ser. No. 761,422, uses extended tubes having openings therein as the solar energy collection members. Specifically, the present invention relates to an improvement in these devices wherein the heat flow through the collector device itself is enhansed.

SUMMARY OF THE INVENTION

The present invention is an improvement to solar energy collectors having members exposed to the sun's rays for collecting solar energy and transferring the heat energy therein to a circulating fluid for utilization. In the flat plate type of collector, the collecting plates of this invention have a non-constant thickness such that the portion of the plate most remote from the circulating fluid has a thinner thickness than that portion of the plate immediately adjacent the circulating fluid. This change in cross sectional thickness of the collector plate varies as a linear function.

In another type of solar energy collector, a plurality of longitudinally extending tubes are constructed in heat exchange relationship with one another to be used to collect solar energy. Each of the tubes has a longitudinally extending opening to permit a portion of the interior of said tubes to be directly exposed to solar rays. A fluid carrying conduit is placed in heat exchange relationship between two of the tubes to allow a circulating fluid to receive the heat collected by the tubes. The present invention is utilized in this type of collector by each of the tubes having a cross-sectional wall thickness dimension in inverse proportion to its distance from the conduit. Therefore, the tubes closest the conduit have a greater wall thickness than the next adjacent tubes while the tubes most remote from the conduit have the thinnest wall thickness.

Accordingly, it is an object of this invention to provide an improved solar energy collector.

Another object of this invention is to provide a solar energy collector wherein the internal heat flow in the collector between the solar energy receiving surfaces and the utilization means is improved.

DETAILED DESCRIPTION

Figure 1:
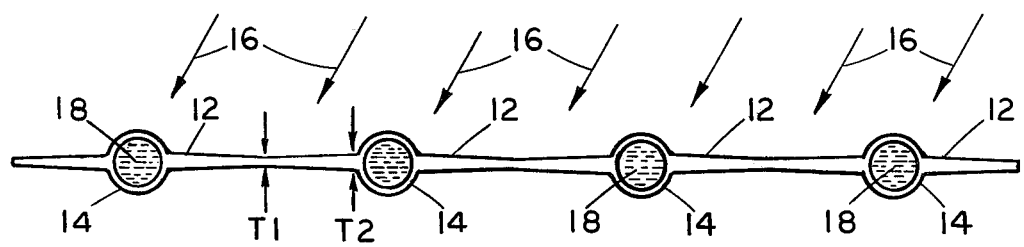
FIG. 1 is a cross sectional view of a flat plate type solar energy collector of typical construction and embodying the present invention.

Referring to FIG. 1, there is shown an improved solar energy collector of the flat plate type wherein a series of flat plates 12 are joined in any suitable manner to a series of conduits 14. The outer surfaces of the plates 12 and conduits 14 are usually covered with a suitable type of heat absorbing material such as flat black paint. As rays 16 from the sun strike the surface of the plates, heat energy is absorbed into the plates and transferred by conduction through the plates to the conduit. Circulating through the conduits is a suitable fluid 18, such as water, which absorbes the heat for utilization at a remote point. In the present invention, plates of non-constant thickness are used to enhanse the conduction of heat to the fluid carrying conduits. The cross sectional thickness of the plates is thinnest T1 at a point equidistant from two of the conduits 14 and gradually increases in thickness reaching its maximum thickness T2 at a point immediately adjacent the conduit.

It is assumed that all surfaces of the plates 12 receive the same amount of solar radiation and therefore that all portions of the surface of the plates have a slight temperature gradient to allow heat to flow. As this heat passes by conduction into the interior of the plate 12, it is drawn parallel to the surface of the plate toward the colder circulating fluid in the conduit 14 because heat flows from a higher temperature to a point of cooler temperature. This is occuring all along the interior of the flat plate. As heat from the portion of the plate most remote from the conduit is transferred along this parallel path, it encounters additional heat energy from the surface above. Therefore, the next adjacent portion is presumally already very close to the same temperature resulting in only a small amount of heat flow toward the conduit.

With the plate tapered construction of applicants invention, as the heat is conducted toward the conduit 14, the thickness of the plate 12 increases. Therefore, the temperature of the next adjacent portion of the plate is slightly less then would be the case of a constant thickness plate because the portion is slighty further from the heat collecting surface. Therefore, there is a greater heat differential and the flow of heat toward the conduit is enhanced.

Figure 2:
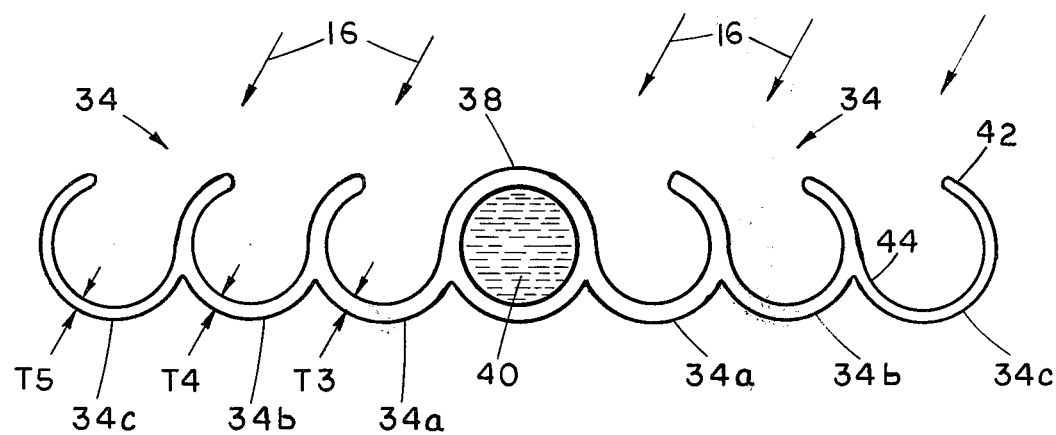
FIG. 2 is a cross sectional view of another type of solar energy collector also embodying the present invention.

Referring now to FIG. 2, there is shown another type of a solar energy collector which is more fully described in applicants aforementioned copending application, Ser. No. 761,422. In this type of collector, solar rays are collected on the interior and exterior surfaces of a plurality of tubes 34 which are each joined in heat exchange relationship with one another. Heat energy absorbed by the tubes is transferred by conduction to a fluid carrying conduit 38 located in the center of the plurality of tubes 34. Any suitable fluid 40, such as water, is circulated through the conduit 38 to absorb the heat energy for utilization at a remote point.

In this embodiment of the present invention, each of the plurality of tubes 34 have a different cross sectional wall thickness in inverse proportion to the distance of the tube to the fluid carrying conduit. The tubes 34a most closely adjacent to the conduit 38 have the thickest cross section shown as T3. The next adjacent tubes 34b are of a thinner cross section (T4) while the most remote tubes 34c are of the thinnest cross section (T5). In the preferred embodiment, applicant is using a thickness of 0.065 inches for the tubes 34a, 0.048 inches for the tubes 40b and 0.040 inches for the tubes 40c. The conduit has a thickness of 0.065 inches. In a similiar manner as described for the embodiment of FIG. 1, it can be seen that this construction will improve the heat exchange capability between the tubes and improve the heat flow from adjacent tubes and heat will be drawn to the centrally located fluid carrying conduit 38 thereby improving the efficiency of the collector.

To further improve the heat flow characteristics of this collector, it may be desirable to provide each of the tubes 34 individually with a non constant cross sectional wall thickness such that the portion of a tube most remote in circumference from the next adjoining tube in a direction toward the conduit 38 is thinner than that portion immediately adjacent the next adjoining tube. While this modified construction is not shown to scale in FIG. 2, the construction may be described with reference to FIG. 2 as follows; in tube 34c, the most remote portion 42 would be thinner than the adjacent tube portion 44 with the tube having a tapered wall thickness between the two portions. Relating back to the previously given tube wall thickness, portion 42 would be about 0.037 inches thick and the tube would gradually increase in thickness until at portion 44, the thickness would be about 0.043 inches. In a similar manner, tube 34b would vary in thickness from about 0.045 inches to about 0.051 inches and tube 34a would vary from about 0.062 to about 0.068 inches. This effect could be accomplished by offsetting a slight amount the centers of the inside and outside radii of each tube member. The complete collector unit constructed in accordance with the preceeding will provide for a heat flow passage through the combined tube members which is constantly incresing in thickness further improving the total efficiency of the collector.

What is claimed is:

1. A collector for capturing solar rays and transferring the heat energy therein to a circulating fluid for utilization comprising:

A. a plurality of longitudinally extending adjoining tubes in heat exchange relationship with one another, each of said tubes having a longitudinally extending opening therein which subscribes an arc of approximately 90° and said openings are oriented in the first quadrant for half of the adjoining tubes and in the second quadrant for the other half of the adjoining tubes to permit a first portion of the interior of said tubes to be directly exposed to solar rays, said tubes having a second interior portion to be exposed to solar rays reflected from said first portion, the interior and exterior surfaces of said tubes having a heat absorbing coating thereon, and B. at least one fluid carrying conduit located in heat exchange relationship with two of said tubes, and each of said plurality of tubes having a cross sectional wall thickness dimension in inverse proportion to its distance from said conduit whereby the tubes in heat exchange relationship with said conduit have a greater wall thickness than the next adjacent tubes and the tubes most remote from said conduit have the thinnest wall thickness.

2. The improved solar collector of claim 1 wherein the wall thickness of each tube is from about 0.8 to about 0.9 of the preceeding thicker wall.

3. The improved solar collector of claim 1 wherein each of said plurality of tubes has a non constant cross sectional wall thickness such that the portion of the tube most remote in circumference from the next adjoining tube in a direction toward said conduit has a thinner wall thickness than that portion immediately adjacent the next adjoining tube.

* * * * *